No. 789,100. PATENTED MAY 2, 1905.
C. E. MURRAY.
HOOF MEASURE.
APPLICATION FILED OCT. 3, 1904.
3 SHEETS—SHEET 1.
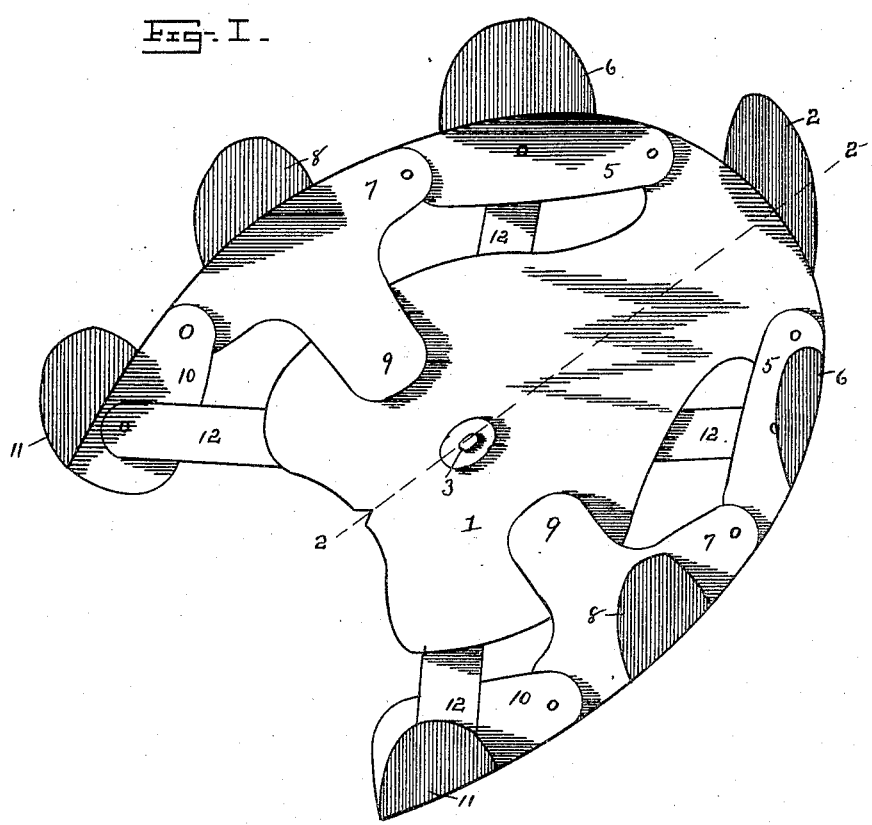
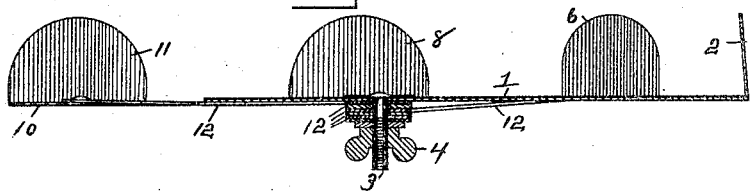

No. 789,100. PATENTED MAY 2, 1905.
C. E. MURRAY.
HOOF MEASURE.
APPLICATION FILED OCT. 3, 1904.
3 SHEETS—SHEET 2.
Fig. III.
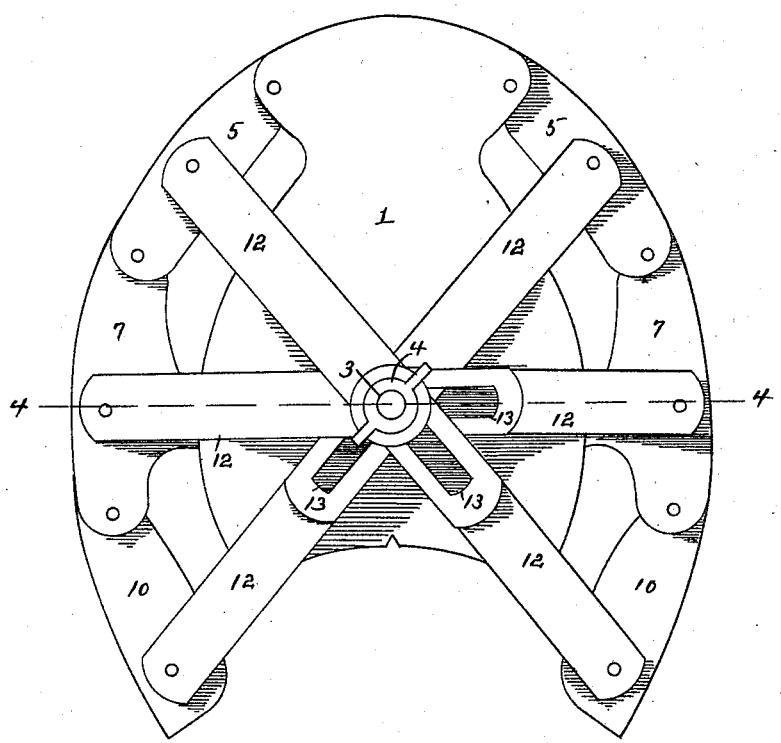
Fig. IV.
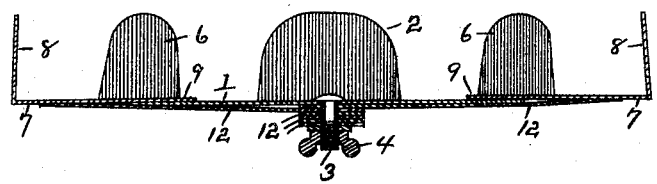
Witnesses
J. A. Coulon
M. C. Smith
Inventor
Charles E. Murray
By A. E. Glascock
Attorney No. 789,100. PATENTED MAY 2, 1905.
C. E. MURRAY.
HOOF MEASURE.
APPLICATION FILED OCT. 3, 1904.
3 SHEETS—SHEET 3.
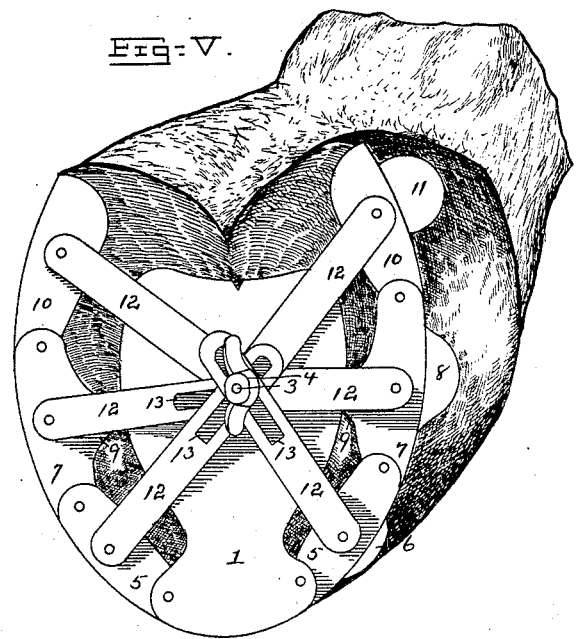
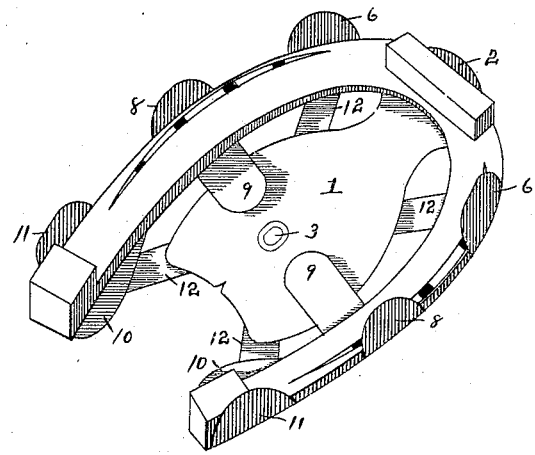

No. 789,100. Patented May 2, 1905.

UNITED STATES PATENT OFFICE.

CHARLES E. MURRAY, OF GREENVILLE, VIRGINIA.

HOOF-MEASURE.

SPECIFICATION forming part of Letters Patent No. 789,100, dated May 2, 1905.

Application filed October 3, 1904. Serial No. 227,026.

*To all whom it may concern:*

Be it known that I, CHARLES E. MURRAY, a citizen of the United States, residing at Greenville, in the county of Augusta and State of Virginia, have invented new and useful Improvements in Hoof-Measures, of which the following is a specification.

This invention has relation to hoof-measures; and it consists in the novel construction and arrangement of its parts, as hereinafter described.

The object of the invention is to provide a measure for horses' hoofs to be used by the shoer at the time that the animal is being shod. As is the general practice now after the hoof is trimmed the shoe is formed and while hot is fitted to the hoof. This burns the hoof, and unless care is exercised the animal is burned and sometimes permanently injured. With my invention there is no necessity of bringing the hot shoe in contact with the hoof. After the hoof is trimmed the measure is applied thereto and adjusted to the proper shape. The parts of the measure are then secured in place and the measure is removed from the hoof. The shoe is then heated and made to fit the measure, when it may be cooled and nailed in place upon the hoof.

In the accompanying drawings, Figure 1 is a perspective view of the hoof-measure. Fig. 2 is a longitudinal sectional view of the measure, cut on the line 2 2 of Fig. 1. Fig. 3 is a bottom view of the measure. Fig. 4 is a transverse sectional view of the measure, cut on the line 4 4 of Fig. 3. Fig. 5 is a perspective view of a hoof having the measure applied thereto, and Fig. 6 is a perspective view of the measure, showing the shoe fitted therein.

The hoof-measure consists of the middle sheet-metal piece 1, made in the general outline of a harp and having at one end the lug 2. The threaded pin 3 passes through the center of the piece 1 and is provided with a thumb-nut 4. The pieces 5 5 are pivoted to the end and on opposite sides of the piece 1. The said pieces 5 5 are provided with the lugs 6 6. The pieces 7 7 are pivoted to the ends of the pieces 5 5 and are provided with the lugs 8 8. The inner projections 9 9 of the pieces 7 7 pass over the surface of the piece 1, as shown in Fig. 1. The pieces 10 10 are pivotally attached to the ends of the pieces 7 7 and are provided with the lugs 11 11. Each of the pieces 5 5, 7 7, and 10 10 is connected by a link 12, which is pivotally attached at its outer end to its respective piece. The inner ends of the links 12 are slotted, as at 13. Said slots are adapted to receive the pin 3, and the inner ends of the links 12 are clamped together against the bottom of the piece 1 by the nut 4. It will thus be seen that by loosening the nut 4 the pieces 5 5, 7 7, and 10 10 may be adjusted to fit the shape of the hoof and when so adjusted the nut 4 may be made to clamp the links 12 to hold the said pieces in their proper positions. The measure may then be slipped from the hoof and the hot shoe fitted therein, as above described.

Having described my invention, what I claim as new, and desire to secure by Letters Patent, is—

1. A hoof-measure consisting of a middle body-piece having a lug at its end, side pieces, each having a lug and being pivoted together, and one of them pivoted to the body-piece, and links connecting the said side pieces with the body-piece.

2. A hoof-measure consisting of a middle body-piece having a lug, side pieces, each having a lug and adjustably attached together, and one of them adjustably attached to the body-piece, and links connecting said side pieces with the body-piece.

3. A hoof-measure consisting of a generally harp-shaped body-piece having at its end a lug, side pieces pivoted together, and one of each set thereof pivoted to the body-piece, each side piece having a lug, and links connecting each side piece with the body-piece.

4. A hoof-measure consisting of a body-piece having a lug, side pieces pivoted together, and one of each set thereof pivoted to the body-piece, each said side piece having a lug, and some of said side pieces extending over the surface of the body-piece, and links connecting said side pieces with the body-piece.

5. A hoof-measure consisting of a body-piece having a lug, side pieces pivoted together, and some of them pivoted to said body-piece, a pin passing through said body-piece, links pivoted at their outer ends to said side pieces, and having slots at their inner ends adapted to receive said pin, and a nut located upon said pin adapted to clamp the links against the body-piece.

In testimony whereof I affix my signature in presence of two subscribing witnesses.

CHAS. E. MURRAY.

Witnesses:
JULIUS L. WITZ,
WM. A. PRATT.